June 25, 1957    P. P. MOZLEY ET AL    2,797,174
METHOD FOR PROVIDING PROTECTIVE METAL COATINGS ON METAL
Filed May 23, 1952    2 Sheets-Sheet 1
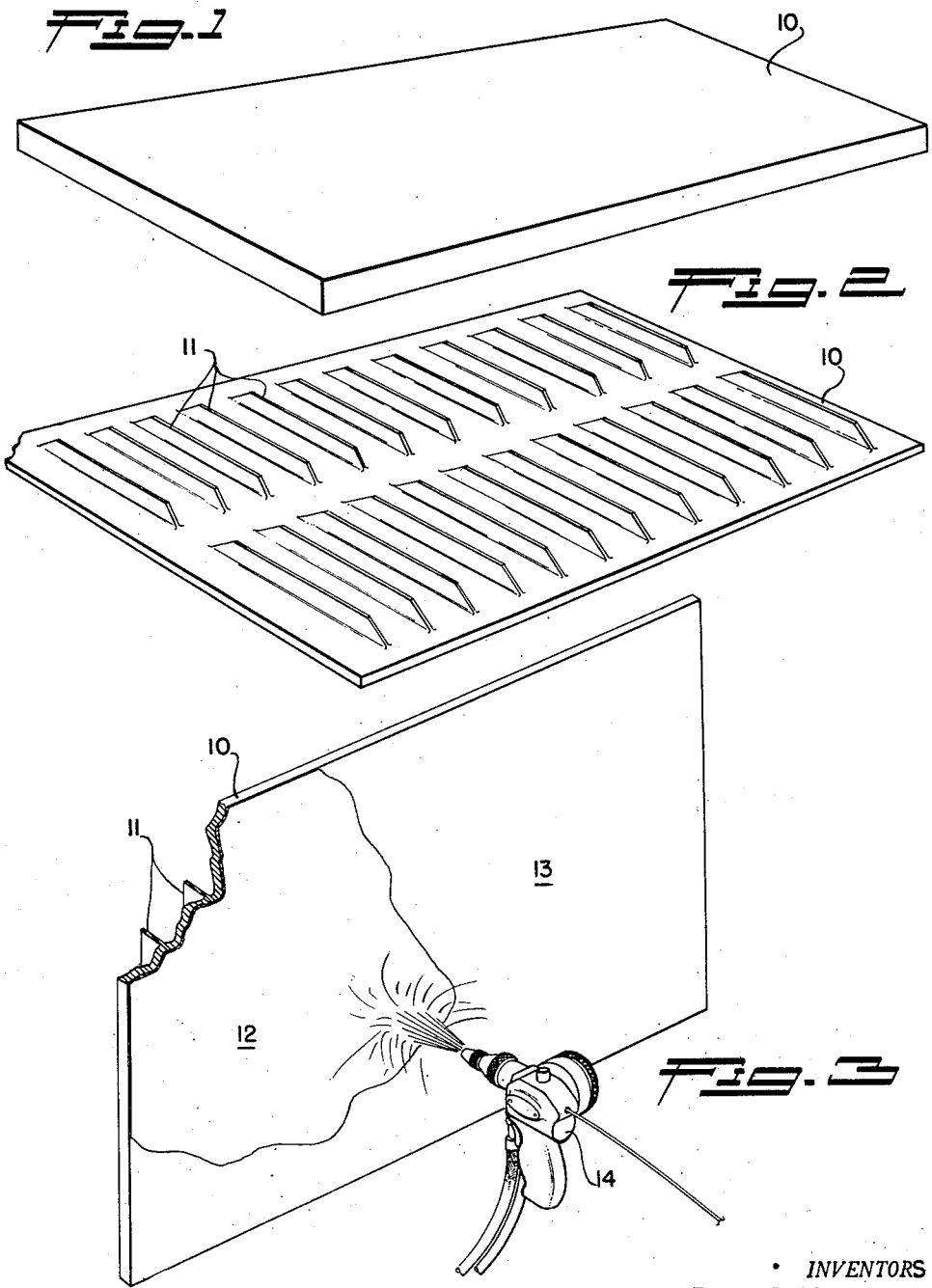
INVENTORS
PAUL P. MOZLEY
HOWARD B. SIPPLE
By
Agent June 25, 1957 P. P. MOZLEY ET AL 2,797,174
METHOD FOR PROVIDING PROTECTIVE METAL COATINGS ON METAL
Filed May 23, 1952 2 Sheets-Sheet 2

INVENTORS
PAUL P. MOZLEY
HOWARD B. SIPPLE
By George C. Sullivan
Agent

United States Patent Office 2,797,174
Patented June 25, 1957

2,797,174

METHOD FOR PROVIDING PROTECTIVE METAL COATINGS ON METAL

Paul P. Mozley, Burbank, and Howard B. Sipple, Glendale, Calif., assignors to Lockheed Aircraft Corporation, Burbank, Calif.

Application May 23, 1952, Serial No. 289,692

7 Claims. (Cl. 117—65)

This invention relates to the treatment of metal parts and relates more particularly to methods for providing protective corrosion resistant coatings on machined or formed metal parts, and the like.

In the production of aircraft, it has been the practice for many years to employ relatively thin sheets of aluminum alloys of suitable strength characteristics and to secure these sheets to the airframe structure by rivets, screws, and other fastening devices, to constitute the skin of the aircraft. This practice requires numerous and, therefore, costly manual operations and necessitates the employment of a large number of supporting and reinforcing ribs for the sheets secured thereto by rivets and other securing devices. To avoid the expense entailed in the production and assembling of the many reinforcing ribs, and the like, and in the installing of the multitudinous rivets and other securing devices, there have recently been introduced what are known as integrally stiffened skins. These are in the nature of plates or sheets having ribs or other stiffening and reinforcing parts machined or otherwise formed directly and integrally thereon, which plates or sheets may be secured to the airframe directly and in any appropriate manner without requiring supplemental and separately manufactured reinforcing or strengthening parts. The integrally stiffened plates or sheets not only greatly simplify the manufacture of the airplane by reducing the number of parts involved and the manual assembling operations previously employed, but are also better adapted to the present day high speed thin-winged aircraft construction.

The aluminum alloys having the strength characteristics adapting them for aircraft use are subject to corrosion and in order to protect the base or basic metal of the sheets, the sheets (not integrally stiffened) have been provided with coatings of substantially pure aluminum, the composite sheets being known as "Alclad" sheets. However, where the integrally stiffened skins are employed, it is futile to use Alclad stock because the machining or other mode of forming the integral stiffening ribs on the sheets or plates requires the machining away of the cladding or coating on the external surface as well as the internal surface, thus exposing the basic alloy or metal. Although it has been the recent practice to anodize and then paint the exposed or external surfaces of integrally stiffened skins or plates to protect them from corrosion, this is not satisfactory or reliable. For example, in high speed aircraft the paint is quickly eroded from the surfaces, leaving the plates or skins without corrosion protection.

It is a general object of the present invention to provide a simple, practical and effective method for protecting integrally stiffened skins, plates, etc. and other aluminum alloy parts against corrosion, abrasion and stress-corrosion.

It is another object of the invention to provide a method whereby an integrally stiffened plate, skin sheet, or the like, is provided with a protective corrosion resistant cladding or coating of metal subsequent to the machining of the stiffening ribs, or the like, which coating is ductile and of such character that it does not crack, break loose, or fail during subsequent shaping or forming of the plate or sheet. In the manufacture of integrally stiffened skin sheets and plates, it is the general practice to machine the stiffening ribs on a flat plate and subsequent to the machining operations the part is shaped or formed to the desired final contour by dies, presses, or the like, and then subjected to high temperature aging or precipitation heat treatment to develop the required physical strength characteristics of the aluminum alloy. In accordance with the present invention the protective metal coating is applied to either or both the interior and exterior surfaces of the part after the machining operations and is then cold worked to make it wrought and therefore more ductile so as to better withstand the subsequent shaping or forming of the part to final contour without cracking, breaking loose, or otherwise failing. One feature of the invention is the cold working of the metal of the protective coating prior to the final shaping or forming of the sheet or part to contour to render the coating ductile and in a condition to flex without failing when the part is formed to final shape.

Another object of the invention is to provide a method of this kind in which the corrosion resistant coating is annealed at the time the basic metal or alloy of the plate or sheet is subjected to the solution heat treatment. This annealing of the metal of the coating, together with the cold working of the same, mentioned above, results in a wrought annealed coating that is capable of flexing during the final shaping or forming of the sheet or part to contour without cracking, breaking loose, or otherwise failing, and in a coating that is fully capable of freely flexing in service as a part of the airplane assembly without injury or detachment from the basic metal of the part. The provision of the protective layer or coating does not in any way interfere with the usual or required heat treatment or aging of the aluminum alloy or basic metal and in fact the solution heat treatment of the aluminum alloy is taken advantage of to anneal the protective coating to render the same more ductile and adherent and, therefore, more valuable and effective as a protective layer.

A further object of the invention is to provide a method of the character described which includes a commercially practical and rapid procedure for applying the protective metal coating to the surface or surfaces of the part. While the invention contemplates the application of the protective metal coating by dipping, particularly in the case of forgings, etc., it will usually be preferred to spray the metal of the coating on the sheet or part. The metal spray method is easy and simple to perform and results in a cast metal coating that is readily cold worked to a wrought condition by shot peening, rolling, or the like, and subsequently annealed to a soft ductile condition upon the subsequent solution heat treating of the part at temperatures above the annealing temperature of the metal contituting the coating.

Other objectives and features will become apparent from the following description of a typical preferred manner of providing a protective metal coating on a more or less typical aluminum alloy part, throughout which description reference will be made to the accompanying drawings in which:

Figure 1 is a perspective view of a piece of plate stock of aluminum alloy, or the like;

Figure 2 is a prespective view of the plate after the integral reinforcing or stiffening ribs have been machined thereon;

Figure 3 is a more or less diagrammatic view illustrating the step of metal spraying the protective metal coating on the plate or part;

Figure 4 is a diagrammatic view illustrating the step of cold working the metal coating by shot peening, or the like;

Figure 4:
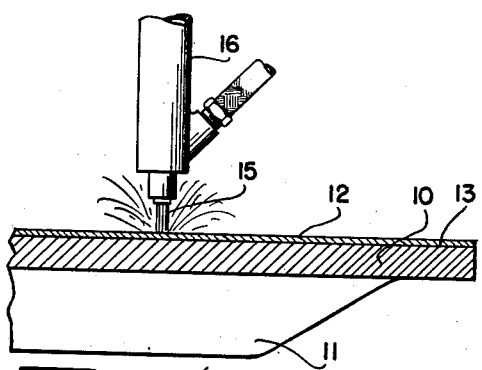
Figure 4A:
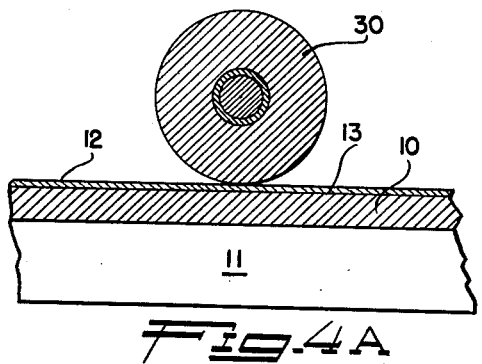
Figure 5:
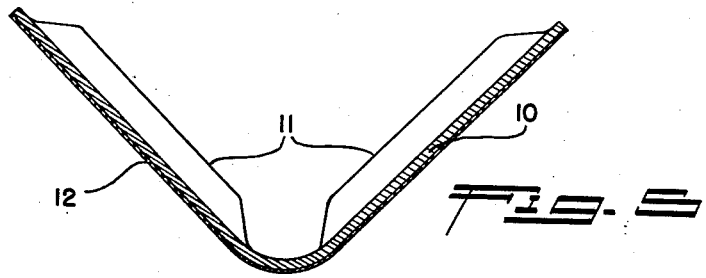
Figure 6:
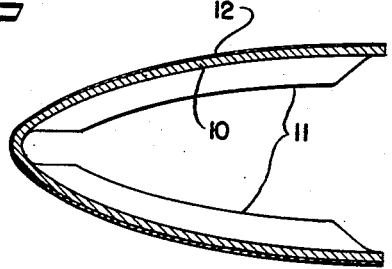

Figure 4-A is a view similar to Figure 4 showing the same step being performed by rolling the coating;

Figure 5 is an edge or end view of the part partially shaped or formed to contour; and Figure 6 is an end view of the part as finally shaped to contour.

In the following description we will make reference to the method as employed to provide a protective metal coating on a surface of a leading edge section of an airplane wing, or the like. It is to be understood that this is merely a typical and illustrative example and is not intended to restrict the invention to any particular type or class of work or application.

As shown in Figure 1, the blank or stock from which the part is to be formed, may comprise a simple flat plate 10 of selected or required dimensions. For aircraft skin parts, etc. the plate 10 may be 24 S-T 6 aluminum alloy, 24 S-T 81 aluminum alloy, or 75 S-T 6 aluminum alloy, these being typical metals or alloys for this and analagous applications. In the manufacture of integrally stiffened skins, such as above referred to, one typical way of making or obtaining the integral reinforcing ribs on the skin sheet is to machine the plate 10 on one side, which we will term the inner side, to provide or leave series of projecting ribs 11. In the case illustrated, the ribs 11 extend transversely of the longitudinal axis of the plate 10 and are in two groups or series spaced at each side at a medial longitudinal region, the ribs 11 of each group being substantially parallel and spaced one from the other axially of the plate. To condition the sheet or plate 10 for the milling or machining operation, its opposite or outer side is first machined flat and true to correct any warpage or other distortion that may have been occasioned by the rolling or other production operations during manufacture of the plate stock. The machining of the ribs 11 of course reduces the mean thickness of the plate and materially reduces its weight, thus adapting it for aircraft use.

The next step is the provision of a cast metal coating or layer 12 on one or more surfaces of the plate 10. In this typical case the layer 12 is provided on the flat outer surface 13 of the sheet or plate 10, it being understood that such a layer may be provided on any and all surfaces as the conditions of intended use dictate. Preparatory to this the surface 13 is cleansed to remove all grease, oil, and all other foreign matter that may be present as a result of the machining operations, etc. The surface 13 may be degreased or alkaline cleaners may be employed for the purpose. It is also desirable to roughen the surface 13 prior to the application of the metal coating. This may be done by grit blasting, or other mechanical means, and assures a better bond or adhesion of the coating 12 to the basic metal of the sheet 10. Following this preparation of the surface 13 the coating 12 is applied thereto, preferably by metal spraying, that is by spraying molten metal onto the surface 13. As diagrammatically illustrated in Figure 3, a nozzle or gun 14 may be employed for this purpose, such metal spray guns being well known in the arts. The entire surface 13 is preferably sprayed with the liquid or molten metal to obtain a coating 12 of substantially uniform thickness. The thickness of the coating 12 will, of course, depend to some extent upon the mode of application of the same and the intended use of the part 10, however, in typical cases the coating 12 will be between 0.002 and 0.010 inch. Aluminum, zinc or alloys of aluminum and zinc are preferably used as the metal of the coating 12. As mentioned above, it is also contemplated that the coating 12 of cast metal may be applied in other ways, for example by dipping the part, particularly in the case of heavy forgings, etc. although it will usually be preferred to metal spray the coating 12, as just described.

The next step of the method is the mechanical working of the coating 12 to decrease the porosity of the coating and to convert the cast metal thereof to a wrought condition and thus increase the ductility of the metal coating. This cold working of the coating 12 may be done in various ways, for example by peening, rolling, or shot peening. In Figure 4 we have diagrammatically illustrated the coating 12 being cold worked by shot peening. Shot 15 is discharged at a substantial velocity from a nozzle 16 to impinge against and peen or work the metal of the coating 12, it being understood that this showing is typical of the ways in which the coating 12 may be cold worked or converted to a wrought state. Thus in Figure 4-A the coating 12 is being cold worked by rolling, and may be subjected to one or more passes of the rolls 30. The coating 12 is substantially uniformly cold worked throughout the area of the work or part 10. The working is performed to the extent sufficient to create a wrought metal structure which would normally require about 25% cold reduction. In the case of shot peening the intensity will correspond to from approximately 0.006 to approximately 0.012 on the Almen A2 gauge.

Following the cold working of the coating 12 the part or plate 10 is solution heat treated. The nature of this heat treatment is determined by the requirements for the particular aluminum alloy constituting the basic metal of the plate 10. For example, where the plate 10 is of 24 S-T 6 aluminum alloy, it may be subjected to a temperature of from 910° to 930° F. for from 1 to 1½ hours, depending upon the thickness of the part. In any event, the temperature of the heat treatment is above the annealing temperature of the metal or alloy constituting the coating 12 which is from, say, 650° F. to 670° F. Thus the coating 12 is annealed simultaneously with the solution heat treating of the basic metal of the part or plate 10. The cast metal coating 12 previously cold worked to a wrought and somewhat ductile condition is thus annealed to a very soft ductile state to be flexible and to retain adhesion to the basic metal of the part 10 during the subsequent forming of the plate or part 10 and the service flexing of the part when it later constitutes an element or portion of the airplane.

Subsequent to the solution heat treatment above described, the part or plate 10 may be shaped or formed to the desired contour. In accordance with the present invention this may be accomplished in any selected, desired or practical manner. For example, if the part or plate 10 is large and is to have a relatively small contour, it may be press-formed in suitable dies, formed by shot peening or formed on a stretch press. If the sheet or plate 10 is to have a relatively sharp or substantial curvature, it may first be formed in a power brake to assume a shape such as illustrated in Figure 5 and then later formed in press dies to the final contour, such as shown in Figure 6. It is to be observed that even with such pronounced bending and forming of the part or plate 10 the wrought annealed metal coating 12 retains adhesion to the basic metal of the part 10 and does not crack, break loose or fail.

After having completed the shaping or forming of the part 10 to the desired configuration it may be subjected to a suitable precipitation heat treatment to age the basic aluminum alloy to the proper temper. The temperatures employed in this treatment and the duration of time for which the part is subjected to the elevated temperatures will, of course, depend upon the particular aluminum alloy constituting the base or basic metal of the part. For example, in the case of 75 S-T 6 the part may be subjected to a temperature of about 250° F. for twenty-four hours, in the case of 24 S-T 6 or 24 S-T 81 it may be maintained at about 375° F. for ten hours. Following the precipitation heat treatment the part may be painted or finished in the usual manner although the external surface provided with the aluminum coating 12 will not usually be painted.

From the foregoing detailed description it will be seen that we have provided a simple, practical and effective method for providing an aluminum alloy part, or the like, with a metal coating for preventing abrasion, corrosion and stress corrosion of the basic metal or alloy. The coating 12, being first cold worked to a wrought condition to reduce its porosity and to increase its ductility, and then being annealed to further and greatly increase its ductility, is very soft and flexible to readily flex during forming of the part 10 and during the surface life of the part, without cracking or loosening its adhesion to the surface of the part. It is to be observed that the provision of the wrought annealed soft metal coating 12 does not interfere with the required heat treating and forming operations to be performed on the plate or part 10. The process or method is well adapted for use on machined metal parts and parts of special or irregular configurations, and is therefore especially suited for aircraft parts although it is not confined to such members or parts or to parts intended for such uses.

Having described only typical forms of the invention we do not wish to be limited to the specific details herein set forth, but wish to reserve to ourselves any variations or modifications that may appear to those skilled in the art and fall within the scope of the following claims.

We claim:

1. The method which comprises directly applying a molten aluminum coating to a surface of an aluminum alloy part, cold working the coating to a wrought condition, solution heat treating the part at a temperature above the annealing temperature of the aluminum constituting the coating, forming the part to the desired contour, and then precipitation heat treating the part to the desired temper of the alloy of the part.

2. The method which comprises directly applying an aluminum coating to a surface of an aluminum alloy part by spraying molten aluminum thereon, mechanically working the metal of the coating to a wrought condition, and then solution heat treating the alloy of the part at a temperature above the annealing temperature of the aluminum of the coating to anneal the wrought metal coating.

3. The method which comprises directly applying a cast aluminum coating to a surface of a part composed of an aluminum containing metal, cold working the metal of the coating to a wrought condition, and then solution heat treating the metal of the part at a temperature above the annealing temperature of the metal of the coating and thus simultaneously annealing the wrought aluminum coating.

4. The method of providing a protective corrosion resistant coating on a formed part of an aluminum containing alloy, comprising applying a coating of cast metal selected from the group consisting of aluminum, zinc and alloys of aluminum and zinc directly to a surface of the part, working the metal of the coating to a wrought condition to reduce its porosity and to increase its ductility, and then solution heat treating the part at a temperature above the annealing temperature of the metal of the coating and thus simultaneously annealing the wrought metal coating.

5. The method of providing a protective corrosion resistant coating on a formed part of an aluminum containing alloy, comprising applying a coating of cast metal selected from the group consisting of aluminum, zinc and alloys of aluminum and zinc to a surface of the part by spraying the same directly on the surface in a molten condition, working the metal of the coating to a wrought condition to reduce its porosity and to increase its ductility by shot peening the coating, and then solution heat treating the part at a temperature above the annealing temperature of the metal of the coating and thus simultaneously annealing the wrought metal coating.

6. The method of providing a protective corrosion resistant coating on a formed part of an aluminum containing alloy, comprising applying a coating of cast metal selected from the group consisting of aluminum, zinc and alloys of aluminum and zinc to a surface of the part, working the metal of the coating to a wrought condition to reduce its porosity and to increase its ductility, solution heat treating the part at a temperature above the annealing temperature of the metal of the coating so that the cast wrought metal coating is annealed simultaneously with said part, forming the coated part to a selected shape, and then precipitation heat treating the formed coated part.

7. The method of providing an aluminum alloy part with a protective corrosion resistant metal coating which comprises roughening a surface of the part, then spraying liquid aluminum on the surface to form a cast aluminum coating thereon, cold working the cast coating to a wrought condition, and then solution heat treating the part to prepare it for forming by subjecting the part to a temperature which is sufficiently high to anneal the metal of the coating simultaneously with said part.

References Cited in the file of this patent

UNITED STATES PATENTS

| | | |
|---|---|---|
| 1,346,062 | Ruder | July 6, 1920 |
| 1,456,274 | Keep | May 22, 1923 |
| 1,726,194 | Sander | Aug. 27, 1929 |
| 2,166,510 | Whitfield | July 18, 1939 |
| 2,401,235 | Farr et al. | May 28, 1946 |
| 2,444,422 | Bradford | July 6, 1948 |
| 2,490,543 | Robertson et al. | Dec. 6, 1949 |